April 7, 1953
L. A. MARIHART
2,633,785
TRACTOR MOUNTED PLANT THINNING MACHINE
Original Filed Dec. 12, 1944
7 Sheets-Sheet 2
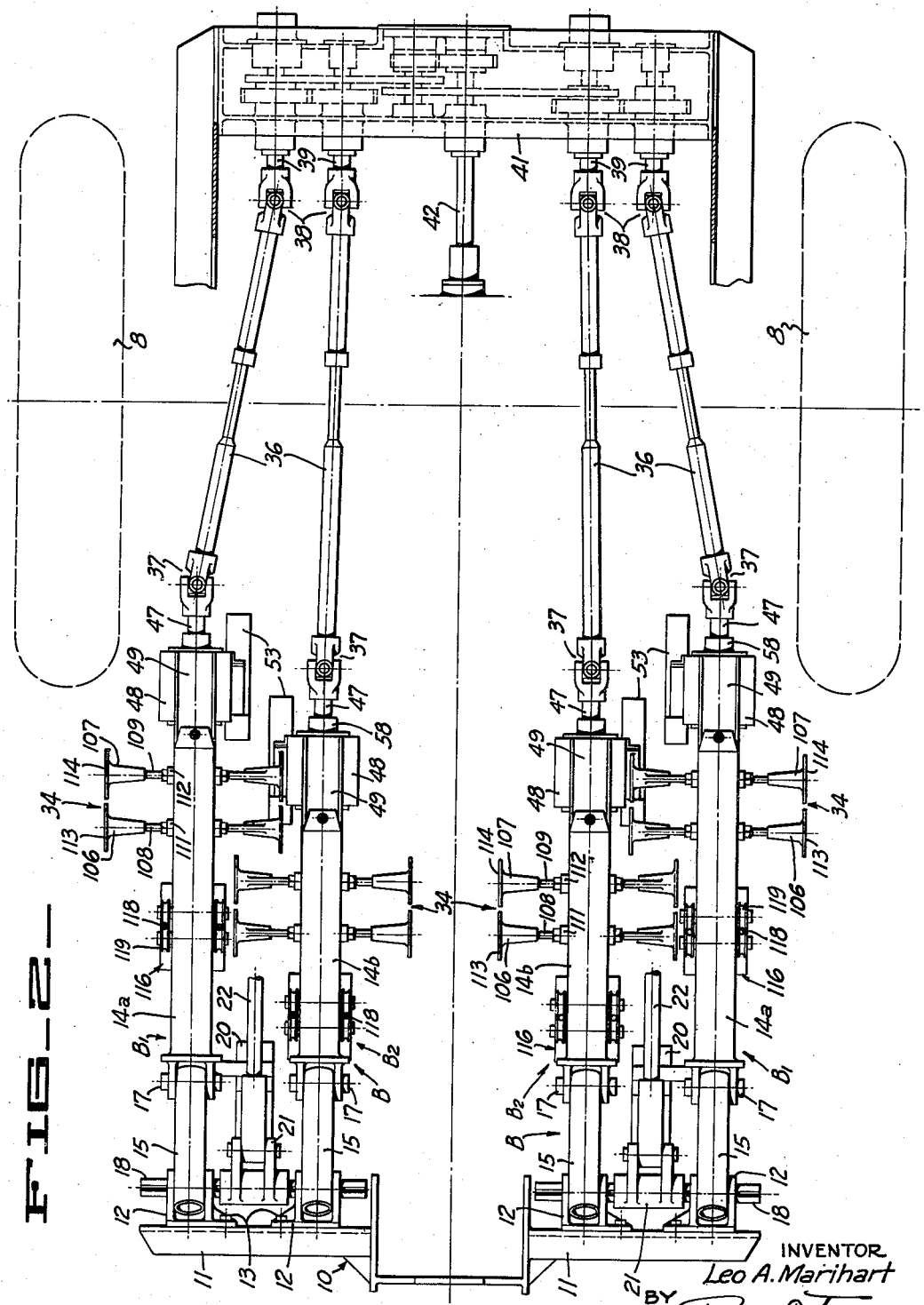
INVENTOR
Leo A. Marihart
BY
Paul D. Fehr
ATTORNEY

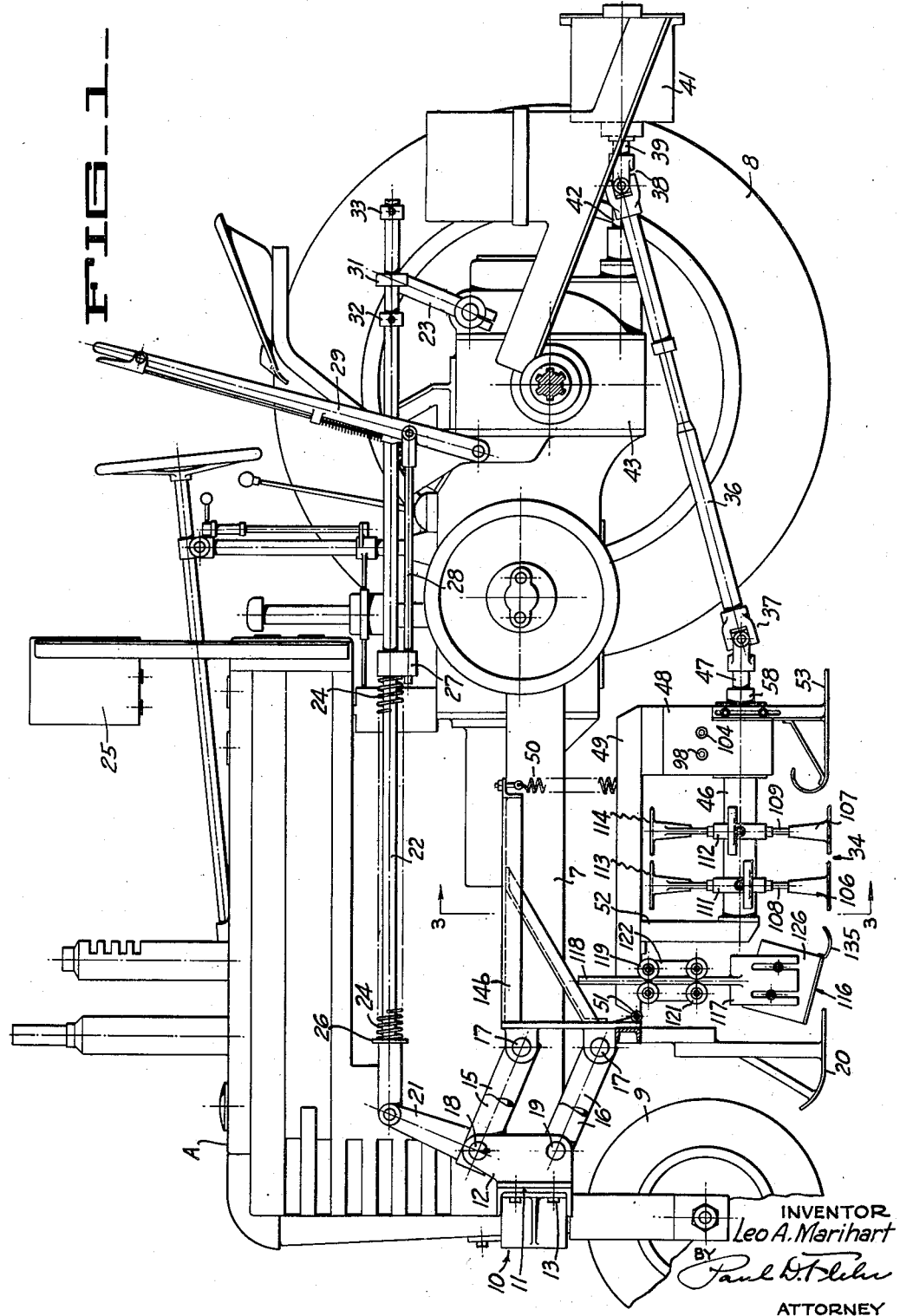

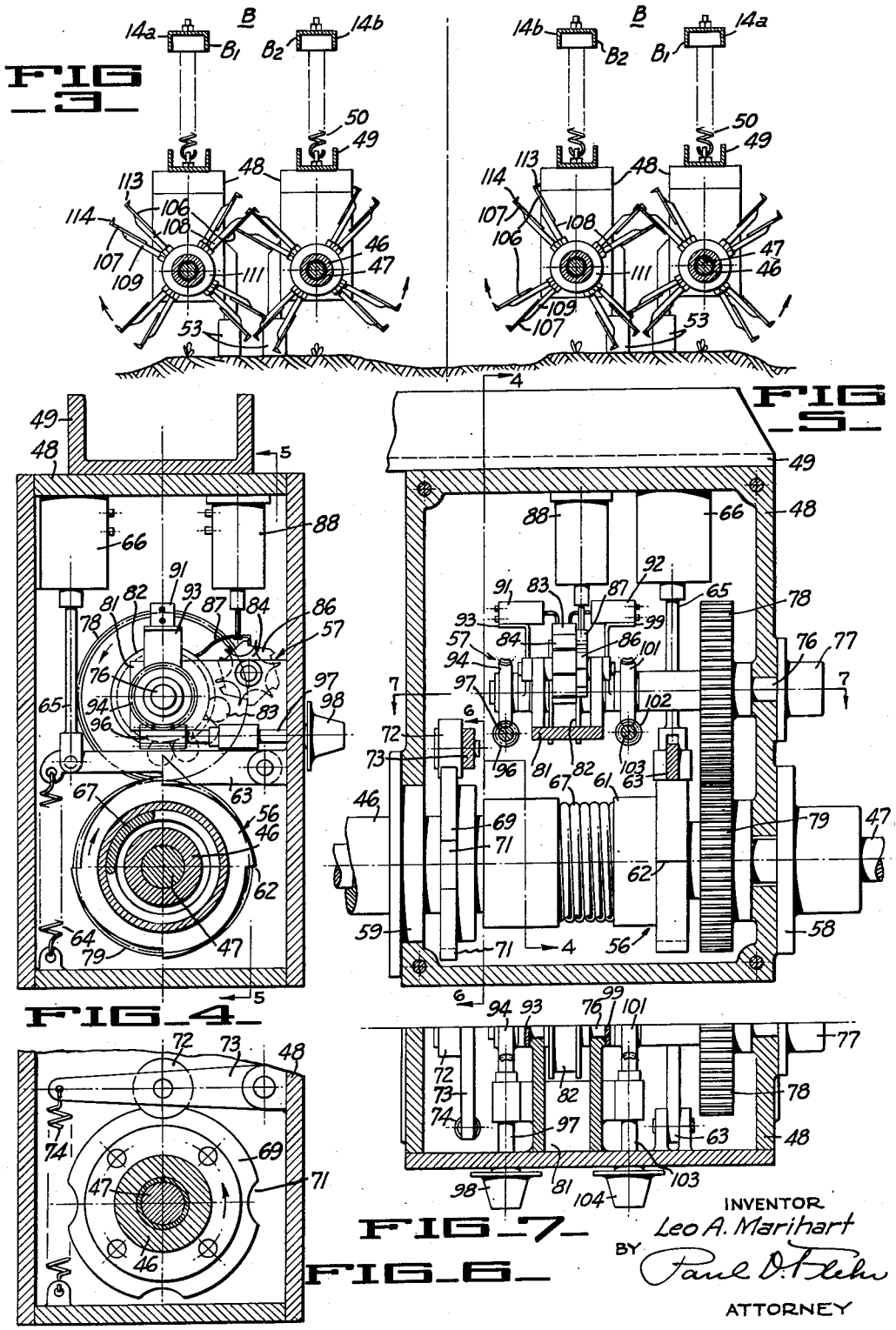

April 7, 1953 L. A. MARIHART 2,633,785
TRACTOR MOUNTED PLANT THINNING MACHINE
Original Filed Dec. 12, 1944 7 Sheets-Sheet 4
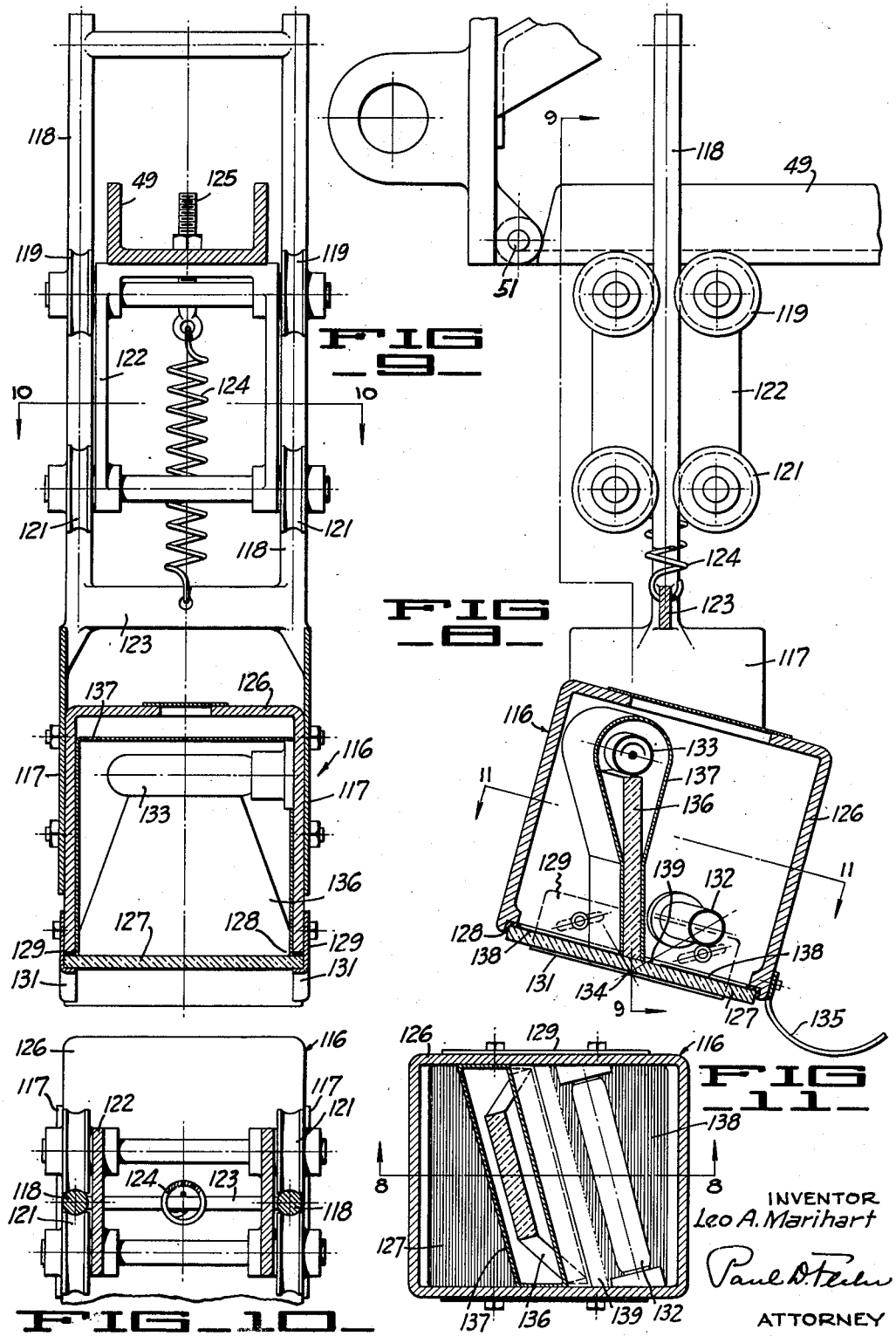
INVENTOR
Leo A. Marihart
ATTORNEY April 7, 1953 L. A. MARIHART 2,633,785
TRACTOR MOUNTED PLANT THINNING MACHINE
Original Filed Dec. 12, 1944 7 Sheets-Sheet 5
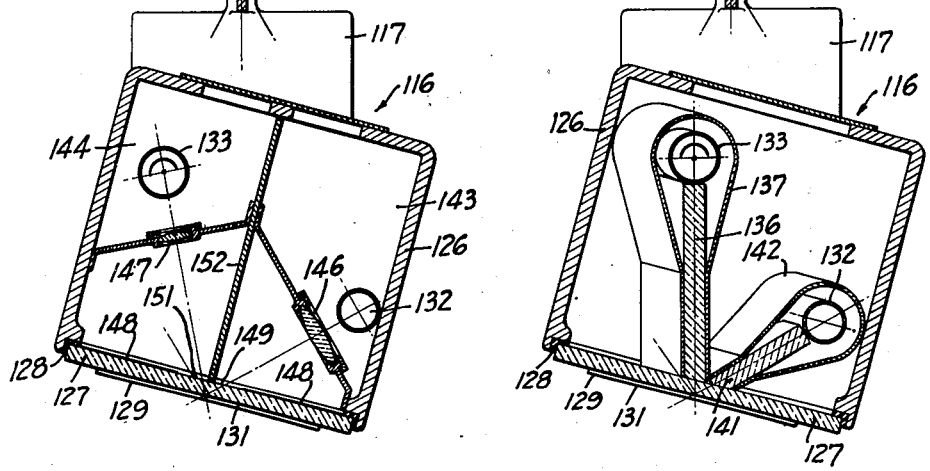
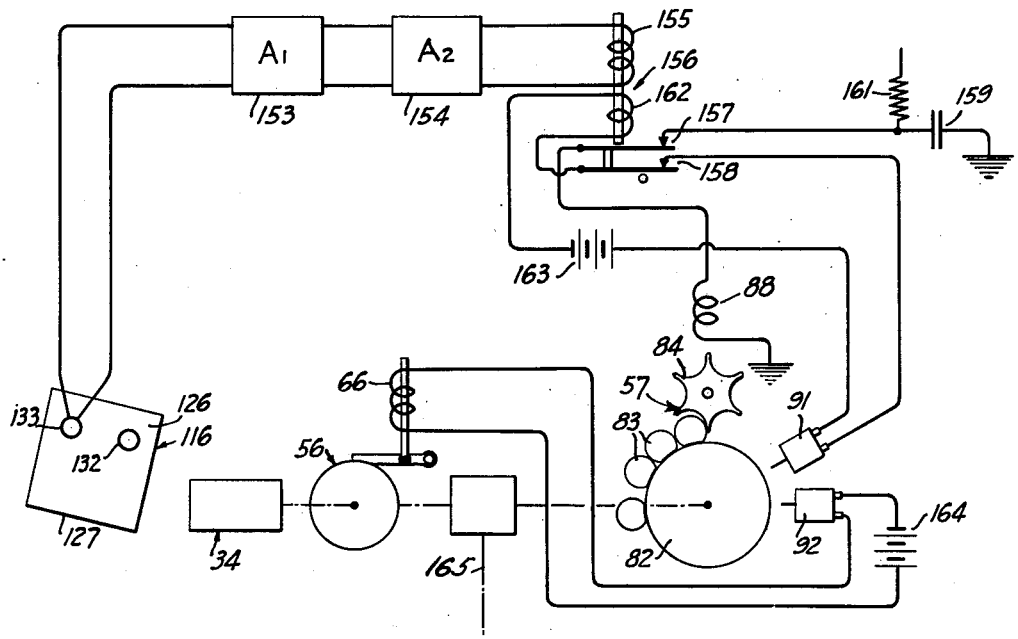
INVENTOR.
Leo A. Marihart
BY
ATTORNEY

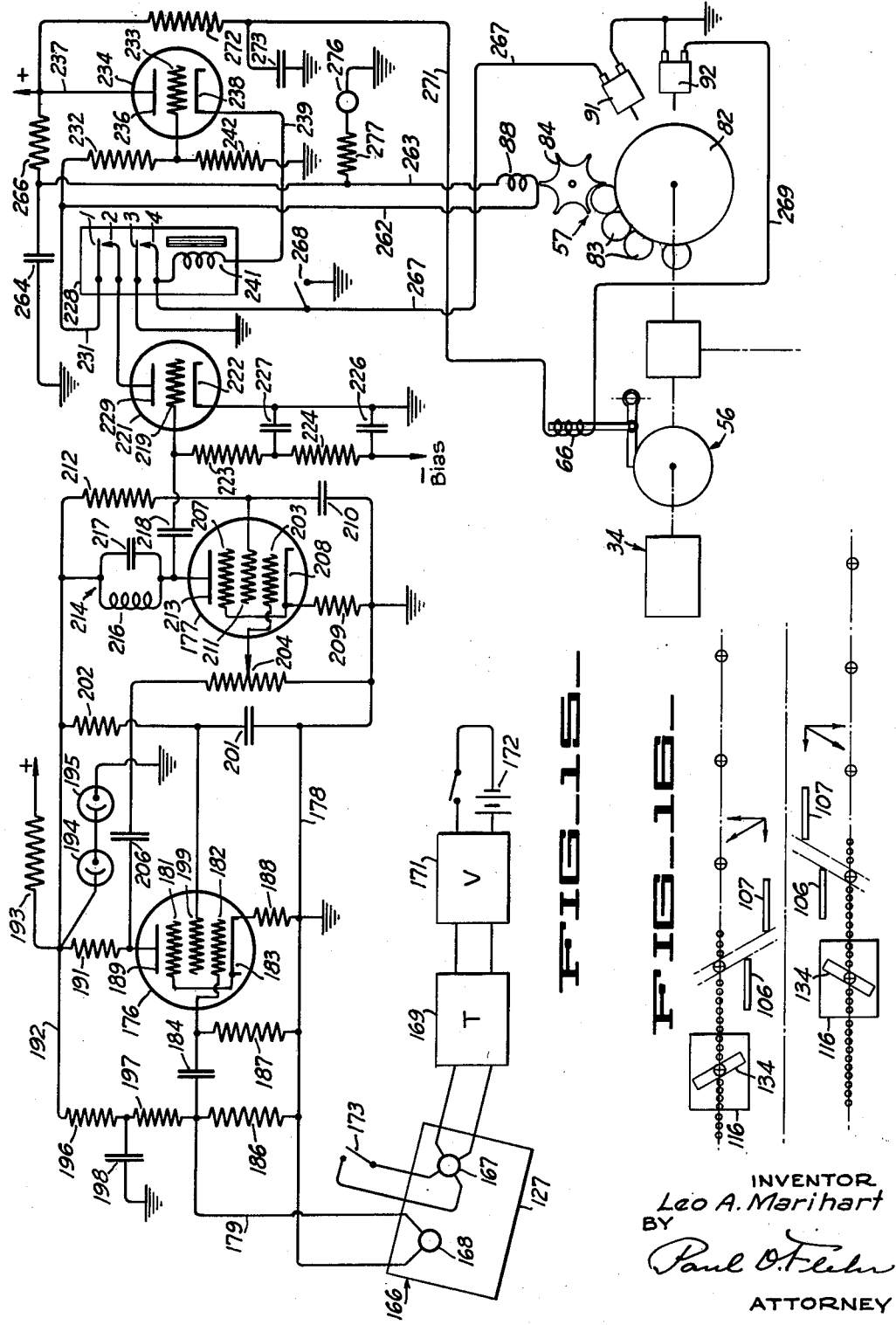

April 7, 1953   L. A. MARIHART   2,633,785
TRACTOR MOUNTED PLANT THINNING MACHINE
Original Filed Dec. 12, 1944   7 Sheets—Sheet 7
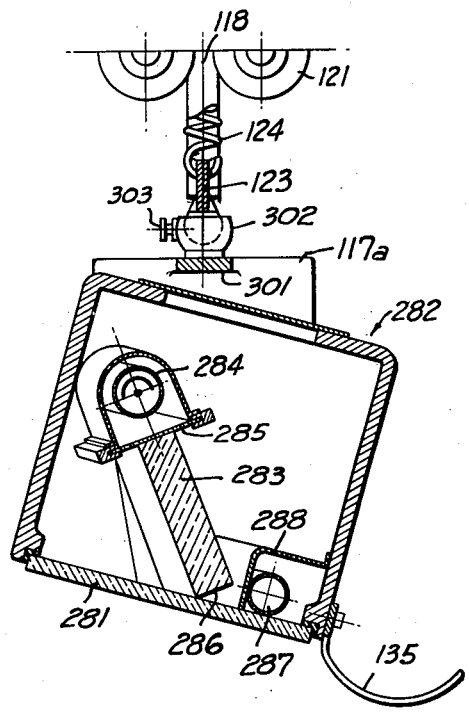
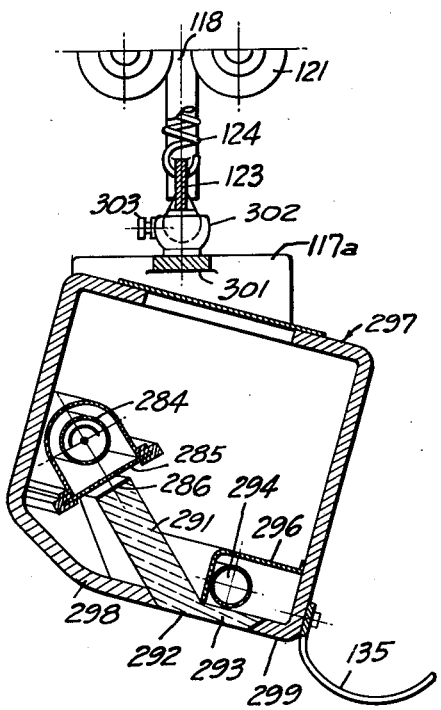
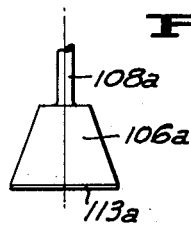
INVENTOR.
Leo A. Marihart
BY Paul D. Flehr
ATTORNEY Patented Apr. 7, 1953

2,633,785

UNITED STATES PATENT OFFICE 2,633,785

TRACTOR MOUNTED PLANT THINNING MACHINE

Leo A. Marihart, Monterey County, Calif., assignor to M. P. H. Industries, Palo Alto, Calif., a corporation of California Original application December 12, 1944, Serial No. 567,852. Divided and this application November 2, 1946, Serial No. 707,438

4 Claims. (Cl. 97—15)

This invention relates generally to machines making use of a photoelectric or light sensitive means for controlling agricultural tools or like operations responsive to light received from plants.

In my Patent No. 2,400,562, dated May 21, 1946, there is disclosed an agricultural machine making use of a frame adapted to travel along a row of plants and having ground engaging cutters or hoeing devices carried by the frame and adapted to operate upon one or more plant rows. The cutters are controlled by light sensitive or photoelectric means whereby controlling light responses are secured from selected plants in a desired condition of growth. Such a machine can be arranged to perform various functions, including particularly the thinning out of plants to leave properly spaced selected plants, and eradication of weeds as the desired plants approach maturity. A portion of the means employed to control the hoeing operations as disclosed in said Patent No. 2,400,562 consists of a device which carries a photoelectric or light sensitive means in conjunction with a source of light which shines upon the plant. This device is caused to pass over the row of plants being operated upon, and the light sensitive means is sighted upon certain portions of the plants to give a response indicative of the position of the root of the plant. The response thus obtained is utilized to trip certain mechanisms for controlling the hoeing operations.

It is an object of the present invention to generally improve upon the machine and method disclosed in the aforesaid Patent No. 2,400,562.

A further object of the invention is to provide a machine of the above character having an improved cycle of operation and a novel combination of means for carrying out the same. In this connection the invention is characterized by the feature that when used for operations such as the thinning out of plants, a minimum spacing is maintained between the plants left standing, but there is no limitation upon the maximum spacing. Thus where the stand of plants secured is relatively poor, the machine does not eradicate good plants for lack of a good plant located within certain intervals, as may be the case with a machine having fixed limitations with respect to both minimum and maximum spacing.

Another object of the invention is to provide a machine and method of the above character which is relatively immune to the effects of exterior daylight, irrespective of whether or not daylight is excluded from the plant portions under observation.

A further object of the invention is to simplify the hoeing or cutting means for acting upon the row of plants, particularly to enable elimination of two sets of cutting devices for each row, one for coarse and another for fine hoeing operations.

Another object of the invention is to provide a novel type of machine for carrying out hoeing operations on plant rows, the parts of which are adapted for mounting upon a standard farm tractor.

A further object of the invention is to improve upon machines of the above character with respect to the mechanism utilized for mounting the various operating parts on a tractor, including particularly the supporting means for the cutters and the devices serving to mount the photoelectric cells.

A further object of the invention is to improve upon machines of the above type with respect to the device or devices which carry the light sensitive means. In this connection the present invention is characterized by the fact that the aforesaid device or devices are constructed in such a manner as to be immune to the effect of dust.

Another object of the invention is to provide novel means for operating upon a row of plants to secure the desired light response, and which will bend the plants over in such a manner as to facilitate an accurate light response indicative of the location of the plants, and for optimum automatic control of machine operations.

A further object of the invention is to provide a device carrying the photoelectric cell which can be operated under adverse conditions over long periods of time without becoming clogged with the vegetation or dirt.

Another object of the invention is to provide a novel arrangement in conjunction with a photoelectric cell and the source of light, whereby the device carrying the photoelectric cell may be displaced from its optimum path of movement without interfering with accurate operation of the plant operating cutters or hoeing devices.

Further objects of the invention will appear from the following description in which the preferred embodiment has been shown in detail in conjunction with the accompanying drawing.

Referring to the drawing:

Figure 1 is a side elevational view illustrating a machine incorporating the present invention.

Figure 2 is a plan view of certain working parts of the machine shown in Figure 1.

Figure 3 is a detailed end view showing the construction and operation of the hoeing devices or cutters, and taken on the section line 3—3 of Figure 1.

Figure 4 is a sectional detail showing the releasable clutch for operating the cutters and the timing device, and is taken on the line 4—4 of Figure 5.

Figure 5 is a section of the same assembly shown in Figure 4, but taken on a plane parallel to the axis of the main drive shaft.

Figure 6 is a sectional detail taken along the line 6—6 of Figure 5.

Figure 7 is a sectional detail illustrating the control adjustments for the switches of the timing device.

Figure 8 is a side elevational view, partly in section, showing the device carrying the photoelectric cell and source of light.

Figure 9 is a sectional view taken along the line 9—9 of Figure 8.

Figure 10 is a sectional view taken on the line 10—10 of Figure 9.

Figure 11 is a sectional detail taken along the line 11—11 of Figure 8.

Figure 12 is a side elevational view in section showing a modified form of device for carrying the photoelectric cell.

Figure 13 is a view similar to Figure 12 but showing another embodiment of the device for carrying the photoelectric cell.

Figure 13a is a side elevational view in section showing another embodiment of a device for carrying the photoelectric cell.

Figure 13b is a view similar to Figure 13a but showing another embodiment of a device for carrying the photoelectric cell.

Figure 14 is a circuit diagram illustrating one form of electrical system which can be used with my machine.

Figure 15 is another circuit diagram illustrating another form of electrical system.

Figure 16 is a schematic view illustrating the manner in which the machine operates in plant thinning operations.

Figure 17 is a detail showing a modified form of cutting blade.

The machine illustrated in Figure 1 has its principal operating parts carried by the frame 7 of a farm tractor A. The balloon tired wheels 8 of this tractor are driven, and the tractor is steered by turning the single front wheel 9. Such a tractor forms a convenient machine for carrying the working parts to be presently described, although it will be apparent that other types of tractors can be employed, or a special trailer or motor operated wheel frame can be used where it is not desired to adapt the machine for mounting on standardized tractors.

A yoke-like frame 10 is attached to the forward part of the tractor, and extending from this frame are the frame members 11 which can be in the form of structural steel channels. A plurality of brackets 12 are attached to members 11 as by means of bolts or screws 13, and their positioning can be adjusted laterally as desired. Attached to the brackets 12 by means to be presently described are the two assemblies B, each of which is made up of the operating units B1 and B2. In general the operating units are capable of operating on two adjacent plant rows of a bed and consist of cutters or hoeing devices in conjunction with light responsive means for controlling the same. In the detail construction illustrated each of the units consists of the connected frames 14a, 14b, which are similar except as to dimensioning. Parallel links 15, 16 have vertically spaced pivotal connections 17 to each of these frames, and also vertically spaced connections 18, 19 to the associated bracket 12. Thus the frames 14a or 14b may move in a vertical direction, but are restrained against angular movement with respect to the horizontal. Ground engaging means such as a runner 20 is adjustably attached to one of the frames 14a, 14b (i. e. frame 14a) and serves to support both frames at a fixed distance with respect to the ground level, which distance however may be adjusted to suit varying operating conditions.

The pivotal connection 18 for each pair of links 15 is in the form of a horizontal shaft, to which the links are keyed. In order to provide means for raising all of the operating units in unison, an arm 21 is fixed to each shaft 18, and is pivotally connected with the forward end of a thrust rod 22. At the rear end of the machine, rod 22 has an operative connection with an arm 23 of a suitable operator, such as one of the hydraulic type commonly furnished on tractors. A compression spring 24 surrounds rod 22, and its forward end seats upon a collar 26 which is fixed to the rod 22, and its rear end seats upon a sliding block 27. A rod 28 is attached to block 27 and also connects with an adjustable manual lever 29. By setting the positioning of lever 29 the tension upon spring 24 can be adjusted, thus adjusting the counterbalancing forces applied to the frames 14a, 14b. The operating lever 23 is shown attached to a collar 31 which in turn is slidable upon rod 22. Spaced collars 32, 33 are fixed to rod 22 and enable application of force to the rod 22 from lever 23, when it is desired to elevate both of the operating units in unison. It will be understood that the means just described for elevating the operating units is duplicated for both sides of the machine. Adjacent frames 14a, 14b must at all times move together in a vertical direction because the corresponding links 15 which carry the frames 14a, 14b are keyed to the shaft 18.

Each of the operating units is provided with hoeing devices or cutters designated generally at 34 and which are driven by the shafts 36, through the universal drive couplings 37. Each shaft 36 is made of telescopically engaged parts which are splined together, whereby the shaft is extensible to accommodate shifts in the relative positioning of the cutters with respect to the frame of the tractor. Each shaft 36 has its rear end connected through a universal drive coupling 38 to a stud shaft 39. These shafts connect with gearing enclosed within the housing 41. The gearing is driven by a shaft 42 which connects with the tractor power take-off shaft extending from housing 43. In general it is desirable that all of the shafts 39 and the attached extensible shafts 36 be driven at the same speed and synchronized with the forward movement of the tractor. Also it is desirable that the gearing within the housing 41 be constructed in such a manner that the drive ratios provided can be adjusted to suit varying operating conditions. The two shafts 36 for adjacent units B1, B2 are preferably driven in opposite directions for reasons which will be presently explained.

The shafting which serves to carry and operate the cutters 34 includes a tubular shaft 46 upon which the cutters are mounted, and an inner shaft 47 upon which the outer shaft is rotatable, and which connects with the universal coupling 37. Shaft 47 extends through and is journaled to a box 48, which in turn is attached to and associated with sub-frame member 49. Each sub-frame member 49 has a pivotal connection 51 on a horizontal transverse axis, with its associated frame 14a, 14b, and it is attached to the corresponding frame 14a or 14b by adjustable tension spring 50. The forward end of shaft 47 is carried by a depending post or bracket 52, which is carried by the sub-frame 49. The box 48 serves to house certain parts including particularly a cycling clutch by means of which the shaft 46 is rotated by predetermined angular amounts.

In order to maintain each box 48 at a fixed elevation above the ground level along the row of plants being operated upon, suitable means such as the runners 53 are provided, and which are adjustably secured to the corresponding boxes 48. It may be explained in this connection that when the machine is in operation the axes of the cutter shafts 46 are aligned generally with the rows of plants being operated upon. Runners 53 are disposed to engage the ground adjacent the plants, while the runners 20 operate on the plant bed between the rows of plants, as illustrated in Figure 3. Therefore the frames 14a, 14b will be maintained a distance above the ground level determined by the contours engaged by the runners 20, whereas the subframe members 49 will be more accurately located with respect to the ground level adjacent the rows of plants being acted upon.

The parts within the boxes 48 (Figures 4, 5) include the cycling clutch 56, and the timer 57. The rear end wall of the box is provided with a suitable bearing 58 for the shaft 47, and the front wall is provided with a bearing 59 for the tubular shaft 46. The clutch 56 which is interposed between these bearings can be of the type disclosed in my Patent No. 2,475,432, issued July 5, 1949. Briefly it includes an annular part 61 attached to an end part provided with ratchet-like steps or shoulders 62, and which are adapted to be releasably engaged by the trigger arm 63. The free end of this arm is urged toward engaged position by tension spring 64, and the arm connects with the reciprocating operating rod 65 of solenoid 66. Associated with an annular member 61 there is a clutch gripping wire 67 which is coiled helicoidally as illustrated and which is retained in non-gripping or released position for engaged position of the trigger lever 63, and while the shaft 47 is being driven in a clockwise direction as viewed in Figure 4. Immediately upon release of lever 63 the wire 67 contracts a sufficient amount to grip an inner part, which in turn establishes a drive between the shafts 46 and 47. Assuming use of four sets of cutter blades each release of lever 63 causes one-quarter revolution rotation of the shaft 46. In order to insure stoppage of shaft 46 at predetermined angular positions an annular member 69 is attached to the shaft 46 and is provided with circumferentially spaced peripheral indentations 71. Roller 72 carried by lever 73 engages in these indentations. A tension spring 74 urges the roller 72 toward engaged position.

While the clutching means described above is desirable and gives good results, it is to be understood that other conventional types of clutching devices can be used which will afford cycling operation with relatively accurate predetermined annular turning of the shaft 46.

The timing device 57 can be substantially as disclosed in my Patent No. 2,437,168, issued March 2, 1948. Briefly it consists of a shaft 76 provided with a journal bearing 77 to one wall of the housing 48. This shaft carries a gear 78 which meshes with a gear 79 fixed to rotate with shaft 47. Shaft 76 also extends through and is journaled with respect to a yoke-like bracket 81, carried by one side wall of the housing 48. Between the sides of this bracket the shaft carries a wheel 82, the periphery of which is frictionally engaged by a plurality of button-like elements 83. These elements may be small permanent magnets as described in said Patent No. 2,437,168, or they may be otherwise constructed in order to be frictionally retained within a trackway formed on the periphery of wheel 82.

Journaled upon the bracket 81 adjacent the wheel 82 there is a star retention wheel 84. Rotatable with this wheel there is a ratchet wheel 86 engaged by pawl 87. Solenoid 88 when energized serves to disengage pawl 87 thus permitting rotation of the star retention wheel 84 for a sufficient angular distance to release one of the elements 83. Assuming continuous rotation of the wheel 82 the released element 83 rotates together with the wheel until it is arrested by its engagement with the series of elements 83 being normally retained stationary by the star wheel.

Suitable switches 91 and 92, such as of the microswitch type, are provided for actuation by elements 83. Switch 91 is shown attached to arm 93, which in turn is attached to the worm gear 94. A worm 96 engages gear 94, and is carried by a shaft 97 which extends to the exterior of the box 48 where it is provided with an adjusting knob 98. Switch 92 is similarly carried by arm 99, which in turn is fixed to gear 101. Worm 102 engages gear 101, and the shaft 103 which carries worm 102 extends to the exterior of the box where it is provided with a similar adjusting knob 104. Thus by turning the knobs 98 and 104 the positioning of switches 91 and 92 can be adjusted to any position desired, and as will be presently explained this adjusts the timing of the machine or in other words the time lapse between receipt of a light response by the photoelectric cell and operation of the cutters. It is desirable that the box 48 be made fluid-tight and that it contain a quantity of oil, whereby the parts are maintained properly lubricated at all times.

As the machine advances along the plant rows, each of the shafts 47 operates continuously. Each shaft 46 is operated recurrently under the control of the photoelectric means to be presently described, to perform for example thinning or weeding operations whereby sturdy plants in good condition of growth are left standing at intervals. The cutting means consists of blades 106, 107 grouped in pairs, with the blades being carried by bars or rods 108, 109, which in turn are adjustably attached to the hubs 111, 112. The blades are provided with turned sharpened edges 113, 114 which face toward the direction of rotation as illustrated in Figure 3, and for thinning operations it is desirable to cut away or contour the edges of the blades as shown in Figures 1 and 2. For operations such as weeding it is desirable to use heavier blades 106a, such as shown in Figure 17. The blades 106, 107 of each pair are spaced apart in the direction of travel as illustrated in Figure 1, and are staggered one in front of the other (in direction of rotation) as illustrated in Figure 3. The arrangement is such that for a given speed of movement of the machine, and for a given speed of rotation when the clutch is released, the two blades of each pair will operate to eradicate plants upon both sides of a selected plant. The width of the blades is such that their areas of operation overlap for the minimum spacing determined by the cycle of operation, as will be presently explained. For example assuming that the minimum spacing is set to be 12 inches, the blades may each measure 8 inches in width, with their zones of operation spaced one inch apart, whereby their zones of operation will overlap for the above mentioned minimum spacing. It will be appreciated that the number of pairs of cutting blades may vary in different instances. For example it is possible to use two sets of cutting blades spaced 180° apart, in which event the clutch 56 must be constructed in such a manner that when released it will cause the shaft 46 to be turned one-half revolution. It is desirable that the blades be attached to their associated hubs 111, 112 in such a manner as to afford some adjustment, whereby the machine can be better adapted to a variety of operating conditions. Also it is desirable that the blades be removable for the purpose of enabling application of blades of different sizes and types. Staggering of the blades one behind the other is desirable in that it tends to avoid clogging between the individual blades of a pair, which would tend to result if these blades were set closely together. Assuming that the rows of plants are distributed substantially as shown in Figure 3, with two rows of plants to a bed and a furrow between the beds, it is desirable that the cutters engage the ground moving in such a direction as to displace dirt and eradicated plants into the furrows between the beds. It is for this reason that the cutters are operated in opposite directions of rotation as indicated.

The device 116 (Figure 1) consists of a box which houses the photoelectric cell and the source of light. It is carried in advance of the cutters 34 by means enabling individual vertical movement of the same. Thus the sides of the enclosing box are adjustably clamped to the supporting plates 117, which in turn are attached to the lower ends of the vertically extending rods 118. Each of the rods operates between the roller sets 119 and 121 which in turn are journaled to the yoke 122 mounted on member 49. A cross brace 123 between rods 118 is connected to member 49 by spring 124, the tension of which can be adjusted by screw 125. Thus the device 116 is made freely movable in a vertical direction and the weight of the moving parts is counterbalanced to a desired degree by the spring 124. By adjusting the tension of spring 124 the device 116 may lightly touch the surface of the ground (as in thinning small plants like lettuce) or may be retained above the ground surface at a desired general operating level (as in thinning or weeding larger plants such as cotton).

In that form of the invention illustrated in Figures 8 to 11 the device 116 consists of a box 126 which is closed to exclude dust, and which has a glass plate 127 extending over its lower face. Suitable means such as a soft rubber gasket 128 can be employed to seal the plate with respect to the side walls of the box. The plate is removably clamped in place by side strips 129 which are releasably attached to the side walls of the box, and which have lower inturned edges 131 which underlie the side edges of the plate. Mounted above the glass plate and within the box there is a light source 132 and a photoelectric tube 133. The light source is preferably an elongated electric lamp, such as a lamp of the glow discharge type having a fluorescent coating on its envelope. The photoelectric tube should have proper characteristics for the light spectrum employed, and for example can be one known by manufacturers' specification as No. PJ-22.

It can be explained at this point that in operating device 116 the glass plate 127 passes over the plants and the foliage wipes across the lower side of the plate. It is the function of the photoelectric tube 133 to secure a light response from a plant in a desired condition of growth, and preferably from a part of the plant which is indicative of the location of the central axis of the plant root. I have found that light responses from plants are indicative of the central axis of the plant root if the light indication is obtained as reflected light from bent over stem portions of the plant. By stem portions I have reference to the portions of the plants near the roots, which in some plants may include some foliage, but which is to be distinguished from the main leafy portion of the plant which spreads out over a considerable area. For accurate indication of plant location I limit the area from which a light indication can be secured to a relatively narrow zone, indicated by number 134 in Figure 8, and which extends in a general lateral direction across the plate 127. It is desirable that this zone be inclined with respect to the direction of movement of the device along the plant row, and that the direction of extent of the zone be generally parallel to the path taken by the cutting blades as they pass through the earth. This serves the purpose of enabling some misalignment of each device 116 with respect to its associated row of plants, without however interfering with the accuracy with which the cutters are brought into play to eradicate plants from both sides of the plant from which a light response has been secured.

With the embodiment of Figures 8 to 11 a narrow strip or response zone is obtained by means which selects reflected light from only a narrow strip or zone and delivers such light to the photoelectric tube 133. Thus a sheet 136 of suitable transparent material such as Lucite or glass is interposed between the photoelectric tube 133 and the inner surface of the glass plate 127 as illustrated. The side edges of this plate are shown convergent toward the tube 133 in order to better collect the reflected light. As viewed in Figure 11 it will be further noted that plate 136 is inclined to the direction of movement at an angle corresponding to the path of movement of the blades through the ground, as previously described. In order to exclude unwanted or extraneous light a suitable opaque shroud 137 is shown about the plate 136 and the photoelectric tube. Also an opaque masking 138 is applied to the upper surface of plate 127, leaving a strip 139 which is unmasked, and through which the light may pass.

As is well known when light passes through the glass plate 127, a certain amount of the light is reflected from the upper and lower glass surfaces. The disposition of the light source, the plate 136, and the plate 127, is such that the angle of reflection of light from the surfaces of plate 127 causes such reflected light to be diverted from passing upwardly through the plate 136. Light reflected from the upper surface of plate 127 cannot enter the lower end of plate 136, and light reflected from the lower surface of plate 127 leaves this lower surface at such an angle that it does not pass upwardly through plate 136. When bent over stem portions of plants pass through the region 134 the angle of reflection of light from source 132 is such that a considerable part of the light reflected from such plant portion passes directly upwardly through plate 136, to actuate the photoelectric tube.

In Figure 8 a curved runner 135 is shown attached to the box 126 and extending downwardly from one rear corner of the same. Such a runner (of a size to suit soil and plant conditions) can be employed to retain the box at a predetermined height above the ground level.

Figure 12 illustrates a modification of the device 116. In this instance a second transparent plate 141, made of suitable material such as Lucite, is interposed between the glass plate 127 and the light 132. The plate 141 together with lamp 132 are provided with the opaque shrouding 142, which can also serve as a reflector. Such an arrangement serves to more definitely distribute and transmit light from the lamp 132 to the zone from which the response is to be made. Here again the angular disposal of the plates 136 and 141 is such that light reflected from the upper and lower surfaces of plate 127 does not enter plate 136 to affect the photoelectric tube 133.

Figure 13 shows another arrangement of light source and photoelectric tube which does not possess some of the advantages of Figures 8 to 12 inclusive, but which can be used in certain instances. In this instance the box 126 is divided into compartments 143, 144 which contain the light 132 and photoelectric tube 133. A lens 146 serves to direct light from lamp 132 to a restricted portion of the plate 127, and lens 147 serves to collect light reflected from stem portions of the plants and direct the same upon the photoelectric tube 133. Here again masking 148 is used to render the greater area of the plate 127 opaque, leaving only the adjacent areas 149 and 151 on opposite sides of the partition 152, for passage of light.

Figures 13a and 13b illustrate further embodiments of the device 116. In Figure 13a the wall 281 of transparent material and the box 282 are substantially the same as the glass wall 127 and box 126 of Figure 8. Within the box there is a Lucite plate or block 283 which has its lower end adjacent the inner surface of the plate 281 and its upper end adjacent the photoelectric tube 284. Plate 283 is tapered toward its upper end in the same general manner as the plate 136 illustrated in Figure 11. A polaroid screen 286 is applied to the lower end of the plate 283, in order to eliminate light due to stray reflections. A color filter 285 is interposed between the upper end of plate 283 and photoelectric tube 284. This filter may be one known as Wrattan No. 30, used with a photoelectric tube of the type known by manufacturers' specifications as No. PJ-22. The light source 287 can be the same as previously described, and is enclosed within the opaque hood or screen 288. The embodiment just described operates substantially like the embodiment of Figure 8 except that it provides a more favorable ratio between the light reaching the tube 284, which represents a desired light response, and extraneous light which may reach this tube, due for example to stray reflections, etc. A color filter of the type described aids in discriminating between desired responses obtained from plants such as lettuce and the reflections from various types of soil, including for example light colored clay, sedimentary soil, adobe, etc. With the combination of the color filter specified and the type of tube specified, the apparatus is made particularly responsive for a light band over a wave length band from about 560 to 800 or more millimicrons. Such a color filter can be used with any of the previously described devices 116.

In the embodiment of Figure 13b the transparent plate 291 has its lower end forming an exterior surface 292 for contacting the plant. An extended transparent wall portion 293, which may be formed either integral with or as a separate part from plate 291, extends below the source of light 294. The light source is enclosed by the hood or screen 296. The enclosing box 297 is provided with lower wall portions 298, 299, which can be formed of suitable metal, and which are suitably sealed with respect to the adjacent edges of the transparent material. It will be evident that the lower surfaces of walls 298, 299 form in effect a continuation of the surface 292, in forming a surface or face which is contacted by the plants.

In both Figures 13a and 13b the attachment of the box includes side plates 117a which are connected by bar 301. A ball and socket assembly 302 serves to attach bar 301 to the rods 118. Set screws 303 can be loosened to permit tilting of the box to any desired position. Thus in addition to tilting the box as shown in Figures 13a, 13b, a side tilt can be provided, which may be desirable where the plants are not growing perpendicular to the ground level.

Devices 116, 282 or 297 may have the positioning of the phototube, lamp and associated parts displaced by 180°, or arrangements such as shown in Figures 8 to 13 or Figure 13a can be reversed end for end (i. e.: turned through 180°), assuming that the runner is properly repositioned on the rear end of the same.

Figure 14 diagrammatically illustrates various electrical parts of my machine and the circuit connections which can be used for the same. The photoelectric tube 133 of each device 116 is connected to an amplifier 153 of the electronic type, which in turn may connect to the input of a second amplifier 154. Relay 156 has one winding 155 of the same connected to the output of amplifier 154 and is shown provided with two sets of contacts 157, 158. Contacts 157 control a circuit which includes condenser 159 (one side of which is grounded), contacts 157, and the solenoid 88 of the timing device 57. Upon closing the contacts 157 condenser 159 is discharged through winding 88 to release one of the elements 83. When contacts 157 are opened condenser 159 is charged by a charging voltage applied to the same through the resistor 161. Contacts 158 control a circuit which can be traced from these contacts through a second winding 162 for the relay 156, a source of current represented by battery 163, and microswitch 91 back to the contacts 158. The contacts of microswitch 91 are normally closed but are opened by passage of one of the elements 83 in proximity to the same. Another circuit is provided which can be traced from the microswitch 92 through the solenoid 66 for releasing the clutch 56, a source of current represented by the battery 164, back to the switch 92. The contacts of switch 92 are normally open.

The cutting devices 34, the clutch 56, and the timer 57 are diagrammatically indicated as being driven from a common shaft 165, which is representative of the motor shaft of the vehicle.

It is desirable that the lamp 132 provide a pulsating source of light, and that the amplifier 153 be of the alternating current type tuned to respond to the same frequency. For example, assuming that lamp 132 is of the fluorescent type, it can be excited with alternating or pulsating current at a regular frequency of say 115 cycles, whereby the light from the lamp has a frequency of 230 cycles. Amplifier 153 can be tuned to respond to the same frequency, and amplifier 154 can be made to provide a direct current output for proper operation of the relay 156. The advantage of such an arrangement is that the machine is made immune to extraneous light which is not pulsated at the frequency for which the apparatus is responsive, and therefore no precaution need be taken to exclude daylight. Assuming however that one desires to use a constant source of light with an untuned amplifier, then daylight should be excluded from the lower side of the plate 127, as for example by providing suitable opaque flaps or curtains along the sides, front and back of the device 116.

Operation of the system shown in Figure 14 is as follows: Assuming that a light indication of proper frequency is obtained by the photoelectric tube 133, electrical pulses of proper frequency operate the amplifier 153, and as a result amplifier 154 supplies current to the winding 155 of relay 156 to close the contacts of the same. Condenser 159 is thereupon discharged through contacts 157 and the solenoid 88, to release one of the elements 83 of the timer 57. At this time it is assumed that the wheel of the timer is being operated continuously in conjunction with advance of the machine along a row of plants, and therefore the released element travels with the wheel toward the switches 91, 92. At the same time the contacts 157 are closed the contacts 158 are closed to provide a holding current from a battery 163 through the winding 162 of the relay. When the released element 83 reaches the microswitch 91 the contacts of this switch are momentarily opened with the result that the holding circuit is interrupted to permit the relay 156 to open both contacts 157 and 158. During the time the contacts 157 and 158 are retained closed, the relay is made immune with respect to further impulses. However after being released by operation of switch 91, the system is in condition to receive a new impulse from any one plant of the row being operated upon. As the released element proceeds to operate the microswitch 92, the energizing circuit for the solenoid 66 is momentarily closed to release the clutch 56. This causes cyclic operation of the cutters 34 to turn the shaft carrying the cutters one-quarter revolution, and to swing one set of cutting blades through the ground immediately in front of and behind the plant from which the impulse was initially received. The released element 83 finally returns to the end of the row of elements awaiting release.

As previously pointed out, during the time interval that the relay 156 holds its contacts closed, the system is immune to receipt of an additional operating impulse. This serves in effect to determine the minimum spacing between plants left standing in the row, although it does not limit or determine the maximum spacing. The maximum spacing is determined by the frequency with which good plants are encountered in the row being operated upon, assuming that the device is so adjusted that a plant must be sturdy and in good condition to provide a proper reflecting surface for securing a desired response. The time delay is also desirable in that it permits location of the photoelectric tube ahead of the cutters, where it is not affected by fragments of soil and foliage thrown to one side as the cutters pass through the ground.

In place of the arrangement of Figure 14 it is desirable to make use of the electrical system disclosed and claimed in application Serial Number 707,510, filed November 2, 1946, now Patent No. 2,596,591, dated May 13, 1952, which is illustrated in Figure 15. This system includes the device 166 which houses the light source 167 and the photoelectric cell 168. The light source is a fluorescent tube excited from alternating current supplied by the transformer 169, which in turn has its primary supplied with pulsating current from the vibrator 171. A suitable battery 172 can be provided for operating the vibrator 171, in a manner known to those skilled in the art. Tube 167 can be of the type provided with a suitable starting circuit under the control of starting switch 173.

The terminals of photoelectric tube 168 connect with amplifying means including the cascade connected vacuum tubes 176 and 177. The particular tubes illustrated are of the triple grid amplifier type, such as tubes known by manufacturers' specifications as No. 6SJ7. Resistance coupling is provided between the photoelectric tube and the input of tube 176. Conductor 178 is connected to one side of photoelectric tube 168, and is grounded. Conductor 179 connects the other side of the photoelectric tube (the anode) to the grid 182, in series with the coupling condenser 184. Coupling resistor 186 connects across conductors 178, 179, and a leak resistor 187 connects between conductor 178 and the grid 182. The cathode 183 and grid 181 are connected to ground through the biasing resistor 188. The anode 189 of tube 176 is connected in series with the resistor 191 to the conductor 192, which in turn is connected to a source of plate supply voltage through the resistor 193. In a typical instance the voltage of the plate supply can be of the order of 350 volts. Conductor 192 connects to ground through the series connected voltage regulating tubes 194, 195. These tubes can be of the type known by manufacturers' specifications as VR150. The voltage is applied to anode of the tube 168 by means of the resistors 196 and 197, which function as a filter in conjunction with condenser 198, and as a voltage divider in conjunction with resistor 186.

The second grid 199 of tube 176 is connected to ground through the by-pass condenser 201, and is also connected to conductor 192 through the resistor 202, whereby a suitable voltage is maintained upon the grid.

The vacuum tube 177 has its grid 203 connected to an adjustable tap on resistor 204, which in turn has its one end grounded, and its other end connected to the plate 189 of tube 176 through the series coupling condenser 206. Adjusting the setting of the tap on resistor 204 serves as a sensitivity adjustment. The grid 207 of tube 177 connects with the cathode 208, and thence to ground through the resistor 209. Grid 211 connects to ground through the by-pass condenser 210, and to the conductor 192 through the resistor 212, whereby a suitable voltage is maintained upon the grid with respect to the potential maintained on the cathode. The plate 213 of tube 177 is connected to the conductor 192 through a suitable tuned circuit 214 consisting for example of the inductance 216 and shunt capacitance 217. This circuit is tuned to the frequency of the light source whereby the amplifying system is responsive only to pulsations of substantially the same frequency.

Condenser 218 serves to couple the plate 213 of tube 177 to the grid 219 of another vacuum tube 221. This tube can be of the thyratron type such as a three element tube known by manufacturers' specifications as No. 884, or a tube of the shielded grid type known as No. 2050. The cathode 222 of thyratron 221 is grounded as indicated, and the grid is connected to a suitable source of negative bias through the series resistors 223, 224. Condensers 226, 227 are shown connected from the negative bias to ground, and from the mid connection between resistors 223, 224 and ground.

In conjunction with the thyratron 221 there is a relay 228 provided with two sets of contacts 1, 2 and 3, 4. The stationary contact 2 connects to the plate 229 of thyratron 221. The cooperating movable contact 1 is connected by conductor 231 and the series resistor 232 to the grid 233 of another vacuum tube 234. This tube can be of the triode amplifier type such as a tube known by manufacturers' specifications as No. 6J5. The plate 236 of this tube is connected by conductor 237 to a suitable source of plate battery potential, such as potential of the order of 250 volts. The cathode 238 is connected by conductor 239 to one terminal of the coil 241 of relay 228. The other side of this coil connects to the stationary contact 4. Grid 233 is also connected to ground through the leak resistor 242.

The release coil 88 of the timer 57 has its one terminal connected by conductor 262 to the conductor 231, and thus to the movable contact 1, and its other terminal connected by conductor 263 to one side of a current supply condenser 264, the other side of which is grounded. Conductor 263 also connects to conductor 237 through the resistor 266. Switch 91, which in this instance is normally open, has its one side grounded and its other side connected by conductor 267 to the stationary contact 4 of the relay. In addition this conductor is connected to one side of a simple push button or switch 268, the other side of which is grounded. Switch 92 has its one side grounded and its other side connected by conductor 269 to one terminal of the clutch release solenoid 66. The other side of this solenoid is connected by conductor 271 to the conductor 237 and to the plate current supply of tube 234 through the series resistor 272. Also conductor 271 is connected to one side of the current supply condenser 273, the other side of which is grounded.

A small signal or indicator lamp 276 of the neon or glow discharge type is shown connected between conductor 263 and the ground, in series with a resistor 277.

Assuming operation at the same frequency as mentioned in connection with Figure 14, namely 230 cycles per second, the various resistors and condensers included in the network may have values as follows: Resistors 186, 187, 196 and 197, 2 megohms; resistor 188, 1200 ohms; resistor 193, 7500 ohms; condenser 198, 20 mfd.; resistor 191, 220,000 ohms; condensers 184 and 206, 0.01 mfd.; condenser 201, 20 mfd.; resistors 202 and 204, 1 megohm; resistor 209, 500 ohms; condenser 210, 20 mfd.; resistor 212, 150,000 ohms; resistor 223, 100,000 ohms; resistor 224, 10,000 ohms; condenser 226, 0.25 mfd.; condenser 227, 0.025 mfd.; condenser 218, 0.01 mfd.; condenser 264, 20 mfd.; resistor 266, 5,000 ohms; resistor 272, 5,000 ohms; resistor 232, 150,000 ohms; resistor 242, 200,000 ohms; condenser 273, 30 mfd.; and resistor 277, 100,000 ohms.

Operation of the electrical system shown in Figure 15 is as follows: Lamp 167 is started in operation by closing the switch 173. Switch 268 is then momentarily and manually closed to energize coil 241 by current supplied from the cathode of the tube 234. Closing of the contacts of this relay causes the relay to be locked closed because the closing of contacts 3 and 4 completes the holding circuit to ground through the coil 241. The grid 219 of the thyratron 221 is biased at this time in such manner that the plate to cathode impedance is relatively high. The plate current source connected to conductor 237 charges condenser 264 through resistor 266, and also charges condenser 273 through resistor 272. As long as condenser 264 is charged the small neon indicator lamp 276 is illuminated. Assuming now that a plant passes beneath the plate 127, it causes a reflected light indication to fall upon the photoelectric tube 168, whereby pulses of a frequency corresponding to the frequency of the light are applied to the input of the amplifier tube 176, and amplified pulses are impressed upon the input of the amplifier tube 177. The amplification system is responsive only to pulses of the light frequency because of the action of the resonant circuit 214. When the tube 177 receives amplified pulses plate 213 assumes a potential differing from the potential of the thyratron grid 219, and therefore the potential of the thyratron grid is changed whereby the thyratron is fired, or in other words the plate to cathode impedance reduced to a relatively low value. When this occurs the condenser 264 discharges through a circuit including the timer coil 88, relay contacts 1 and 2, and the plate to cathode path of the thyratron, to effect release of the star wheel of the timer to thereby release one of the elements 83. Discharge of the condenser 264 as described causes the lamp 276 to be extinguished.

Simultaneously with discharge of condenser 264 the potential of conductor 231 and grid 233 of tube 234 is reduced from a relatively high positive value of the order of say 200 volts, to a relatively low value. This serves to block the plate current of tube 234, or in other words to provide a relatively high plate to cathode impedance. As a result flow of holding current through the relay coil 241 is interrupted or reduced to a relatively low value, whereby the contacts of the relay are released. Release of the relay renders the network inoperative insofar as further pulses from the photoelectric cell 168 are concerned. Upon release of the relay 228 the opening of contacts 1 and 2 permits the grid 233 of tube 234 to again assume a relatively high positive value, with the result that the plate to cathode impedance of this tube is again made relatively low.

When the released element 83 has traveled sufficiently far to operate the switch 91, closing of this switch establishes a current flow through coil 241 of the relay, with the result that the relay is again closed to cause the apparatus to be conditioned to receive another light response. When the released element reaches and operates the switch 92, a circuit is closed which includes coil 66 and the condenser 273, whereby this condenser discharges through the coil 66 to release the clutch 56. Release of this clutch permits the cyclic operation of the cutters 34 to perform a thinning operation as previously described. Immediately upon discharge of condensers 264 and 273 in the manners described above they are recharged by current supplied from the plate current supply connected to conductor 237.

The electronic network of Figure 15 and the controls for the same can be housed within a suitable box 25 (Figure 1). The controls provided for the operator on the panel of this box include the pilot light for each unit, and also a sensitivity control for each unit formed by a potentiometer representing the resistor 204 of Figure 15.

An explanation of Figure 16 will assist in understanding complete operation of the machine. The simplified diagrammatic elements indicated in this figure represent the elements of like numbering of the machine. The cutting blades 106, 107 are indicated as engaging the ground while moving outwardly of the bed and toward the adjacent furrows, and also moving forwardly with the general movement of the machine frame. In cutting through the row of plants they eradicate plants in front of and behind a selected plant, over a predetermined interval. The extent of operation of each set of cutting blades is preferably made such that it is substantially greater than the minimum spacing determined by the timing device, as previously described, and somewhat greater than the normal expected spacing between plants left standing. Assuming that the machine is being used for thinning operations on plants like lettuce, the blades can be proportioned so that each set cuts over a length (in the direction of movement of the machine) of about 16 inches, and the timing device set so that the minimum spacing between plants left after the thinning operation is about 12 inches. The devices 116 which carry the photoelectric cells pass in wiping engagement with the young plants, tilted at an angle such as illustrated in Figure 8. With plants like lettuce the counterbalancing of each device can be such that the rear edge of the glass plate 127 rides lightly upon the ground surface (or a short runner 135 can be employed), whereby the plants of proper growth are bent over to expose bent over stem portions as they are received in the response zone 134. When a sturdy stem portion is received in the zone 134, that is the stem portion of a sturdy plant in such proper condition as to permit the same to stand, a light response is obtained from the photoelectric tube and as the result the solenoid of the clutch 56 is tripped to activate the cutters 106, 107, there being a sufficient time delay as previously described whereby the cutters are brought into play to cut away in front of and behind the plant from which the response has been secured. This is indicated diagrammatically in Figure 16, the plants left standing being indicated by a crossed circle. The resultant path of movement of the cutters through the ground in front of and behind a selected plant is substantially parallel to the direction of the regions 134. Thus some misalignment of the devices 116 and the associated cutters with respect to the centers of the row being operated upon does not result in a substantial inaccuracy. Figure 16 illustrates how for a reasonably good stand of plants, the plants left standing will all be at or near the minimum spacing. However when the stand of plants is poor, as may occur at certain points along the row, the spacing may be as much as two feet or more between the plants left standing.

The above will make clear the primary features of the invention. It will be evident that the fields in which my machine is to be utilized should be sown in accurately spaced rows, with the rows as straight as possible. When the seeds have germinated and the plants reach a proper size for thinning, my machine is employed to take the place of the usual hand thinning operations. The machine is first lined up with the row of plants upon which it is to be operated, and the frames 49 are lowered until the skids or runners 20 and 53 engage the ground. The depth to which the cutters operate is dependent upon the adjustment of the runners 53, and upon the adjustment of the blades themselves with respect to their associated hubs. When at rest the cutters 106, 107 assume an angular position in which the cutting blades clear the ground. However when actuated by release of clutch 56 the cutting blades rotate one-quarter of a revolution and as previously described during such rotation two blades pass through the ground in front of and behind the selected plant to eradicate the plants which are not desired. It will be evident that in some instances where the stand is relatively close, more than one plant will be left standing between the zones of operation of the blades. However such groups can be readily thinned out by a simple manual clean-up operation. Also it is evident that where the stand is relatively poor and where the selected plants left standing are spaced relatively far apart, some poor plants may be left standing between the good selected plants. Such poor plants can be readily removed by a manual clean-up operation.

It will be evident that the machine is capable of various set-ups for different types of plants, and for different types of operations desired upon plant rows. For thinning operations the machine can be used to advantage with a wide variety of plants, including lettuce, cabbage, cotton, broccoli, sugar beets, and radish. After the plants have been thinned and have reached a fair degree of maturity the machine can be utilized to advantage for weeding operations to eradicate undesired weeds between the plants. For weeding operations it may be desirable to introduce suitable color filters in conjunction with the source of light or the photoelectric tube, or both, in order to provide for proper color discrimination between the desired plants and the weeds.

In operating upon plants, such as cotton, which are relatively sturdy and are not planted closely, the devices 116 can be adjusted (by use of a runner 135 of proper length) to normally operate at a considerable elevation above the ground, whereby a light indication is secured from the lower leafy portions of the plant or the portions nearest the central plant stem.

As an example of various adjustments which can be made to suit the machine to different operating conditions, the two assemblies B can be adjusted close or farther apart, and the units B-1, B-2 can be likewise adjusted, thereby accommodating the machine to plant rows different distances apart. The faces of the cutters can be adjusted with respect to angularity and distance from the axis of rotation, to suit the machine to different soil conditions and different types of plants.

As has been pointed out in connection with the description of various types of devices for carrying the photoelectric tube, the box or mounting for these devices can be tilted to different angles in connection with adjusting the vertical positioning of the same above the ground level. Combined adjustments of this type serve to best adapt the machine to different size plants, and particularly serve to vary the size of the plant which the photoelectric tube must view in order to trip the clutch. Thus by proper adjustment of the general elevation of the device 116 and by tilting the same to a suitable angle, it is possible to discriminate against poor undersized plants (such as lettuce plants being thinned), and to select only sturdy plants which are equal to a minimum size requirement.

My machine is not affected by severe dust conditions. This is because the glass plates 127 are being continuously wiped by the plants, and therefore they are kept sufficiently clean at all times for transmitting light. In addition responses are obtained from portions of plants which contact or are in relatively close proximity with the lower surface of the plates 127, where the plant portions can be viewed relatively clearly. In other words the intensity of the light response is critical with respect to the distance of the foliage from the surface of the transparent material and falls off at a disproportionate rate as the spacing is increased. This characteristic increases the accuracy of the response and aids in discriminating against light reflected from extraneous surfaces, such as the surface of the ground. It has been found that the plate 127 will be kept wiped clear of dust irrespective of various climatic, dust or plant conditions. Moisture or dew upon the plants will not cause serious incrustation or accumulation of films of dirt or dust, and the same is likewise free of oils or plant juices commonly found upon plant leaves. In general as the devices 116 pass over the plants of the row the plants are viewed commencing with the root and traveling towards the leaves. This insures a light response from a portion of a sturdy plant which is relatively close to and indicative of the central vertical axis of the plant root. Thus in operating upon plants such as lettuce it has been found that when a sturdy plant is viewed it is only necessary for a small length of the bent over stem to appear in view in the zone 134, in order to secure a desired response. The plants are not damaged by passing under the devices 116 or below the rear edges of the plate 127. The upper sides of the glass plates and also the photoelectric tube and light source, being entirely enclosed, are not affected by dust or moisture conditions The edge contouring of the blades 106, 107 is desirable in that it tends to prevent a windrow effect at the ends of edges 113, 114, which tends to drag soil across the selected plant with possible covering of the same. However as previously mentioned, heavier blades may be preferred for weeding and like operations.

In the foregoing it has been presumed in describing operation of the machine that the plants are grown in raised beds, with two rows to the bed, and with furrows between the parallel beds. In some instances however it is not customary or desirable to cultivate the plants in this manner. It will be evident that my machine can be adjusted for use with other types of agricultural methods as for example where the plant is grown on flat ground without intervening furrows.

Certain features of my invention have application to a variety of argricultural machines, including for example machines for harvesting plants or products, or for controlled application of sprays or fertilizer to plants.

This application is a division of subject matter disclosed and claimed in my copending application Serial No. 567,852, filed December 12, 1944, now Patent No. 2,502,468, dated April 4, 1950, and entitled "Agricultural Machine and Apparatus."

I claim:

1. In an agricultural machine of the type described, a frame adapted to move along a row of plants, a secondary frame carried by the main frame, means enabling elevation or lowering of said secondary frame to a desired position, hoeing means adapted to operate upon the row of plants, means forming an attachment between the hoeing means and said secondary frame to enable vertical movements of said hoeing means with respect to the ground level, a ground engaging member contacting the ground adjacent the plant row and serving to maintain said hoeing means at a generally fixed elevation with respect to the adjacent ground level, irrespective of the vertical positioning of the main frame, a device including a photoelectric tube disposed in advance of the hoeing means and adapted to be moved in close proximity with the row of plants, means serving to carry said device from said secondary frame enabling free vertical movement of said device relative to both the secondary frame and said hoeing means, and means enabling automatic control of said hoeing means by said photoelectric tube.

2. In a machine of the character described having a frame adapted to be traversed along a row of plants and a device including a photoelectric tube carried by the frame and adapted to pass in close proximity with the plants, the photoelectric tube serving to receive light reflected from portions of plants, hoeing means carried by the frame and adapted to operate upon the row of plants, and power means for operating the hoeing means whereby the resultant path of movement of the hoeing means through the ground as the machine moves forwardly is at an angle to a plane normal to the path of movement of the vehicle, said hoeing means being controlled by the photoelectric tube; the improvement comprising mounting means for said tube and light transmitting means carried by said mounting means and interposed between the tube and said plants, said light transmitting means serving to transmit light from a confined relatively narrow zone disposed parallel to the resultant path of movement of the hoeing means.

3. In a machine of the character described, a frame adapted to be traversed along a row of plants, rotary plant hoeing means carried by the frame and adapted to operate upon the row of plants and including at least one pair of cutting blades disposed to cut in front of and behind a selected plant, power means for driving said hoeing means, each of said cutting blades having a blade length measured longitudinally of the row of plants which is less than the minimum spacing to be left between plants, a light source carried by the frame and serving to illuminate the plants of a row, photoelectric means in advance of the hoeing means and carried by the frame in position to move in proximity with a row of plants, said photoelectric means serving to receive light responses from plants in good condition and in advance of cutting operations upon the row, means serving to control operation of said hoeing means responsive to receipt of a light response by said photoelectric means, said means including means for interposing a predetermined time interval delay between the receipt of a light response and the operation of said hoeing means, and means serving to prevent operation of said hoeing means by receipt of a second light response within a predetermined period of time following receipt of one operating response, said last means serving as means providing a predetermined minimum spacing between good plants left standing, said minimum spacing being greater than the cutting length of each of said cutters.

4. In a machine of the character described, a frame adapted to move along a row of plants, rotary hoeing means adapted to operate upon the row of plants, said hoeing means including at least one pair of cutting blades disposed to pass in front of and behind a selected plant when the hoeing means is rotated, each of said blades having a cutting length as measured in the direction of travel of the machine which is less than the minimum distance desired between plants, a source of light carried by the frame and serving to illuminate the plants of a row, a device including a photoelectric tube adapted to receive light responses from plants located in advance of said hoeing means, power means for operating said hoeing means, means for controlling application of power to said hoeing means in response to the receipt of light responses by the photoelectric tube, said means including means for interposing a predetermined time delay between the receipt of a light response from a good plant and operation of said cutting mans, and means for rendering the system immune to the receipt of a second response by the photoelectric tube for a predetermined time interval after the receipt of an operating response, said last means serving as means to provide a predetermined minimum spacing between the plants left standing which is greater than said cutting length.

LEO A. MARIHART.

REFERENCES CITED

The following references are of record in the file of this patent:

UNITED STATES PATENTS

| Number | Name | Date |
|---|---|---|
| 1,303,798 | Janes | May 13, 1919 |
| 1,313,242 | Ashley | Aug. 19, 1919 |
| 1,667,367 | Wilgus | Apr. 24, 1928 |
| 1,776,830 | Chenault | Sept. 30, 1930 |
| 2,177,803 | Ferte et al. | Oct. 31, 1939 |
| 2,182,157 | McDermott | Dec. 5, 1939 |
| 2,207,097 | Logan | July 9, 1940 |
| 2,307,310 | Tyler et al. | Jan. 5, 1943 |
| 2,400,562 | Marihart | May 21, 1946 |
| 2,433,856 | Marihart | Jan. 6, 1948 |